United States Patent [19]

Lamarche

[11] 4,139,995
[45] Feb. 20, 1979

[54] HIGH DEFLECTION AMPLITUDE TORSIONAL VIBRATION DAMPER

[75] Inventor: Paul E. Lamarche, Utica, Mich.

[73] Assignee: Borg-Warner Corporation, Chicago, Ill.

[21] Appl. No.: 865,082

[22] Filed: Dec. 27, 1977

[51] Int. Cl.² .................. F16D 3/14; F16D 47/02; F16D 69/00

[52] U.S. Cl. .................. 64/27 C; 64/27 R; 192/106.2

[58] Field of Search .............. 64/27 C, 27 CS, 27 R; 74/574; 192/106.2

[56] References Cited

U.S. PATENT DOCUMENTS

| 1,830,746 | 12/1931 | Ahlene | 74/574 |
|---|---|---|---|
| 2,149,887 | 3/1939 | Hickman | 64/27 C |
| 2,210,074 | 8/1940 | Friedman | 192/106.2 |
| 2,513,379 | 7/1950 | Thelander | 74/574 |
| 2,571,291 | 10/1951 | Reed | 192/106.2 |
| 2,574,573 | 11/1951 | Libby | 192/106.2 |
| 2,632,318 | 3/1953 | Meyer | 64/27 C |
| 2,764,004 | 9/1956 | Myers | 64/27 C |
| 3,107,551 | 10/1963 | Cline | 74/574 |
| 3,327,820 | 6/1967 | Marnice | 192/106.2 |
| 3,628,353 | 12/1971 | Armstrong | 74/574 |

FOREIGN PATENT DOCUMENTS

| 166,939 | 8/1921 | United Kingdom | 64/27 C |
|---|---|---|---|
| 1,152,807 | 9/1957 | France | 64/27 C |
| 1,289,560 | 2/1962 | France | 64/27 C |

Primary Examiner—Benjamin W. Wyche
Assistant Examiner—R. C. Turner
Attorney, Agent, or Firm—James A. Geppert

[57] ABSTRACT

A high deflection amplitude torsional vibration damper for use in a torsional coupling between a driving member and a driven member, such as a clutch driven member, utilizing a unique compression spring arrangement to provide a high deflection amplitude combined with a low spring rate. The damper includes a hub receiving a driven shaft and having oppositely disposed arms, a pair of equalizers with oppositely extending arms journalled on the hub, a pair of cover plates enclosing the assembly and havng integral driving means formed therein, and a plurality of compression springs within the plates and positioned between the hub and equalizer arms. A clutch friction element may be secured to the cover plates.

19 Claims, 12 Drawing Figures

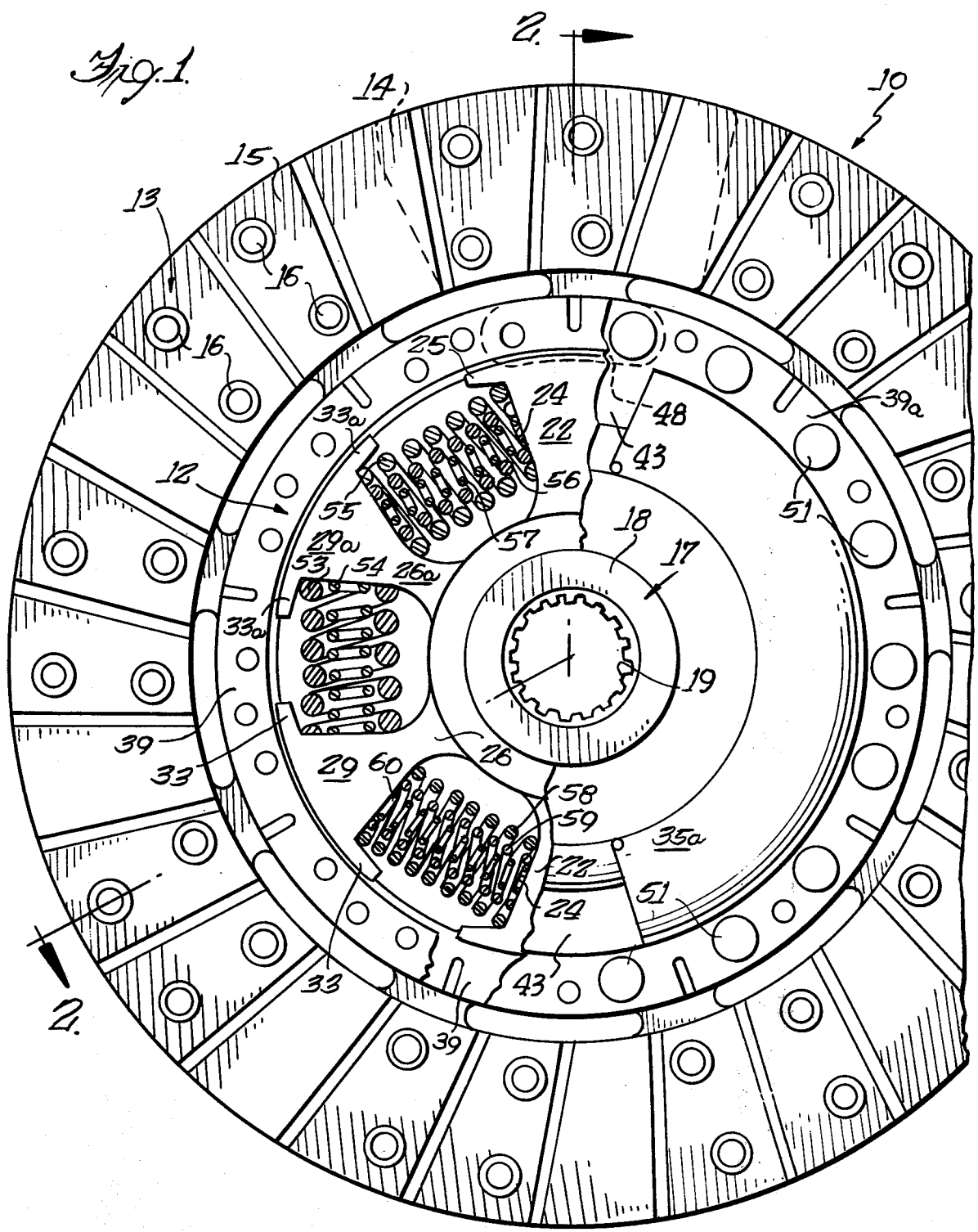

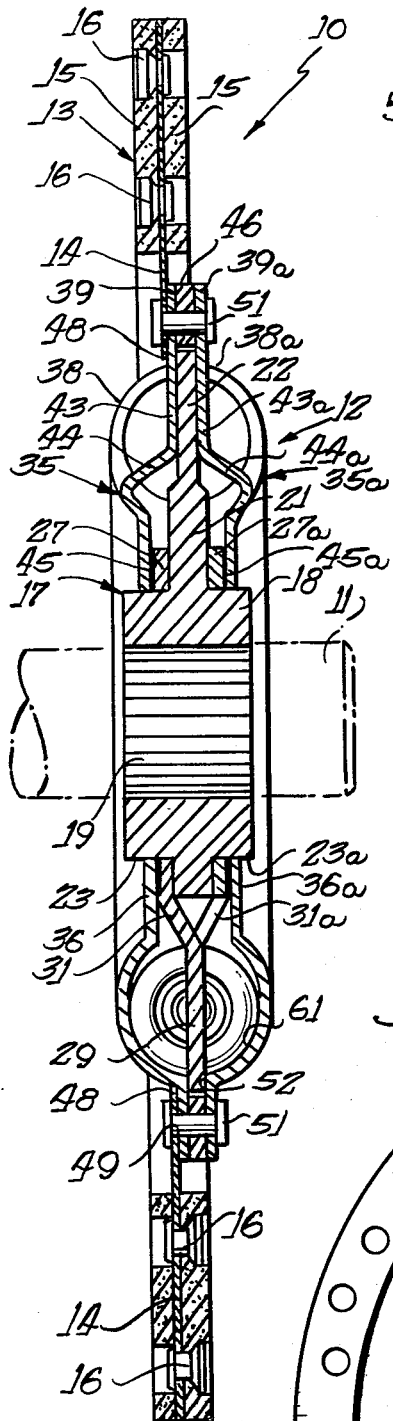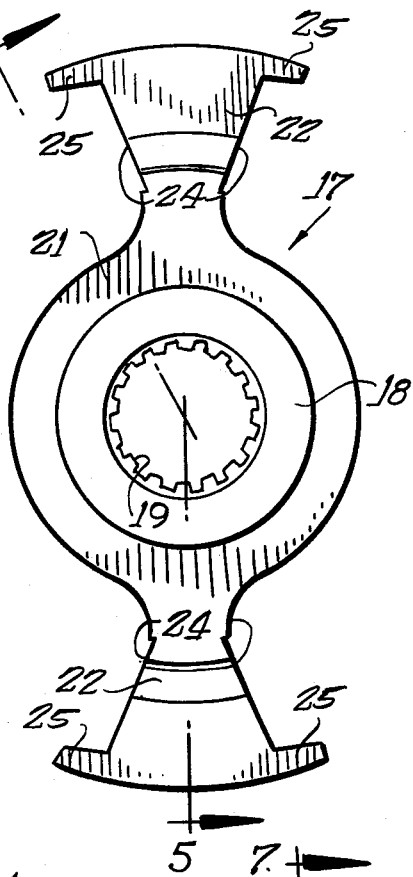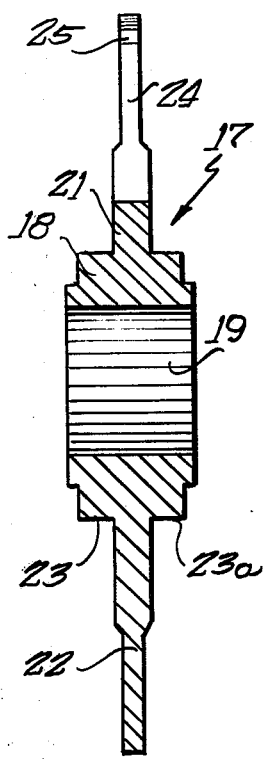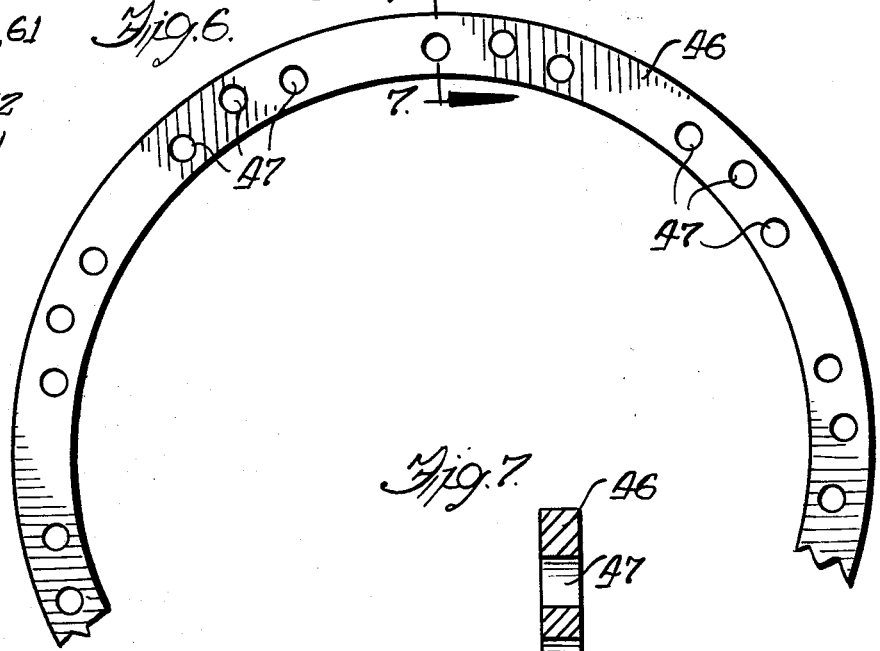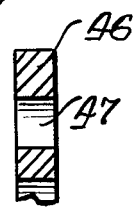

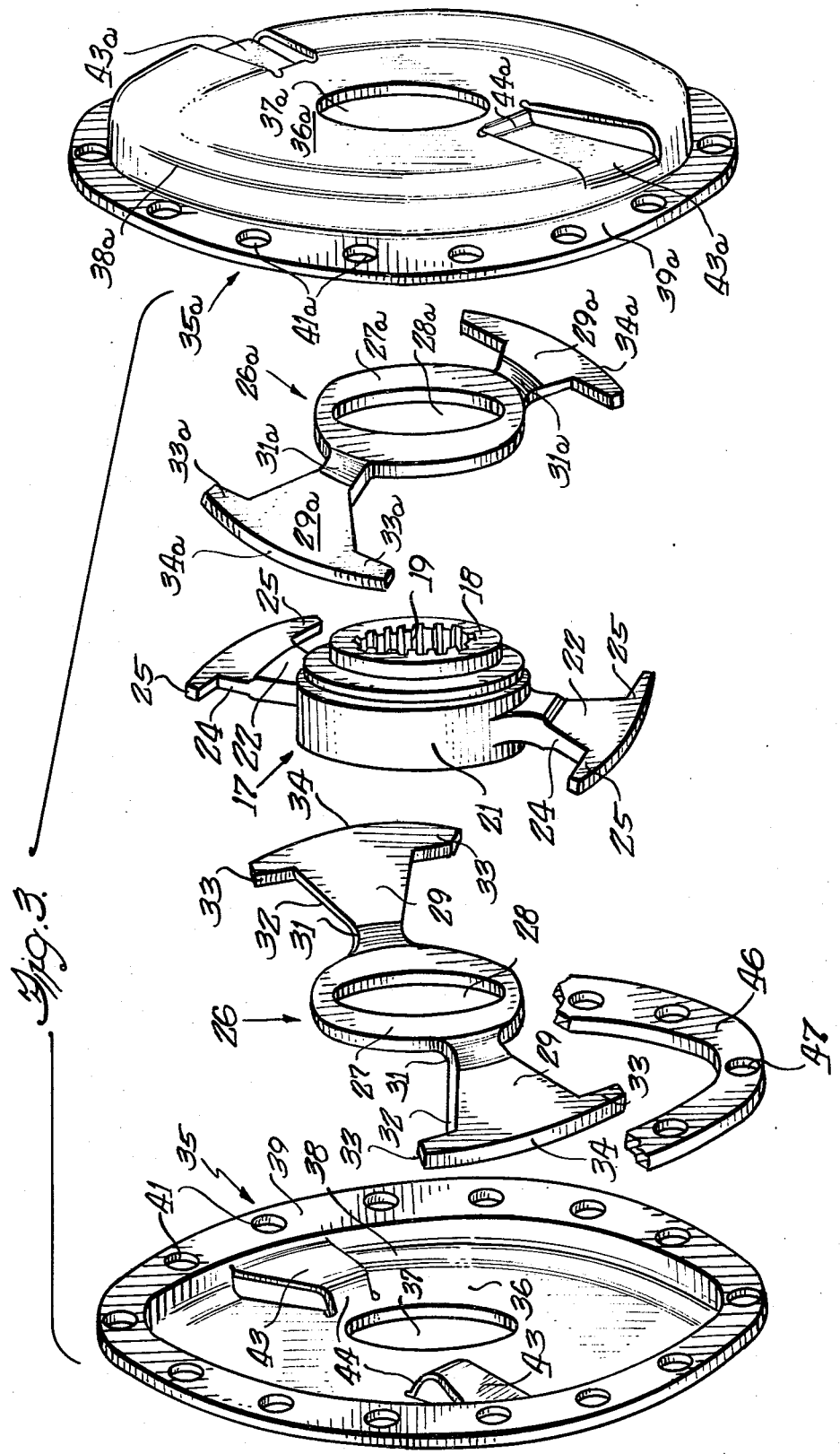

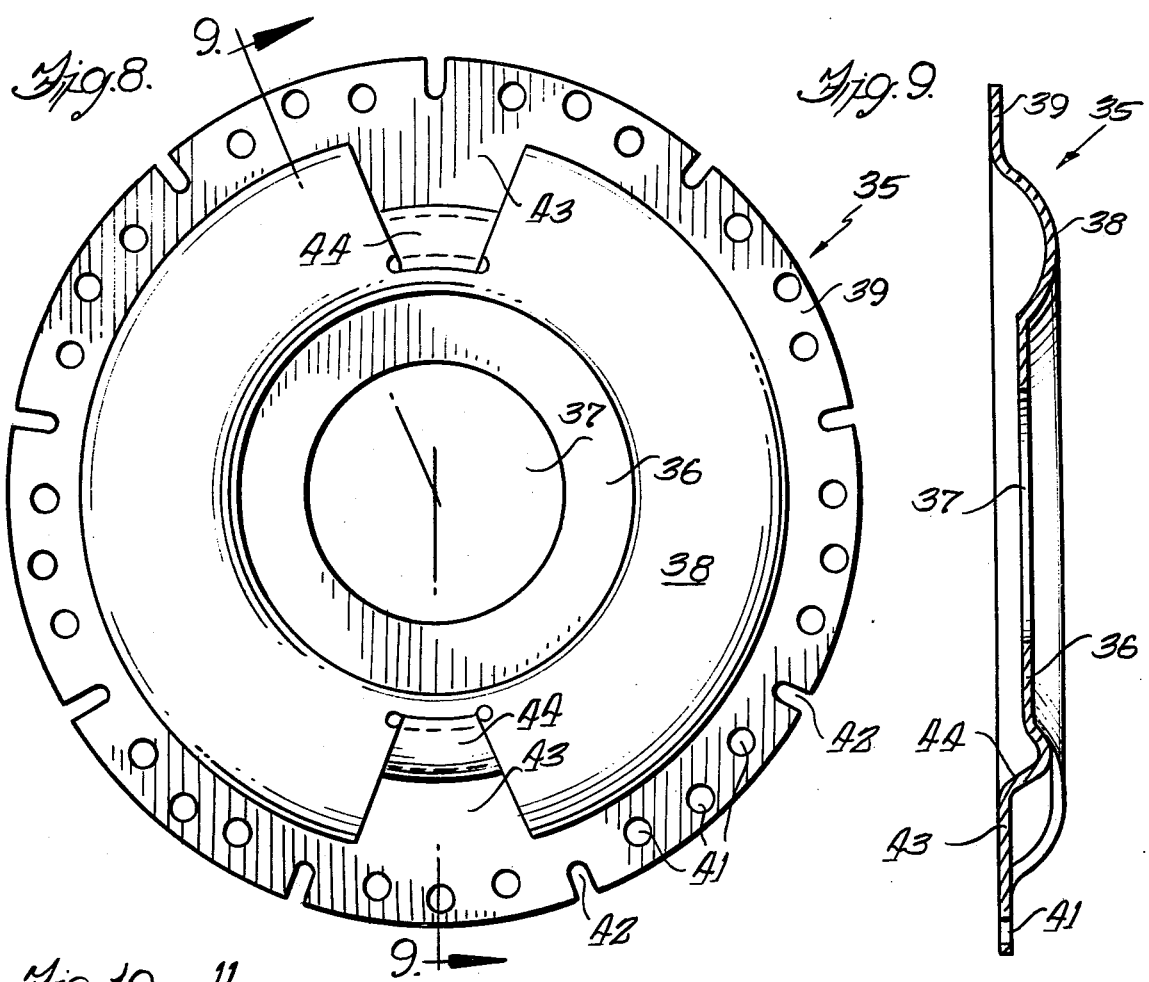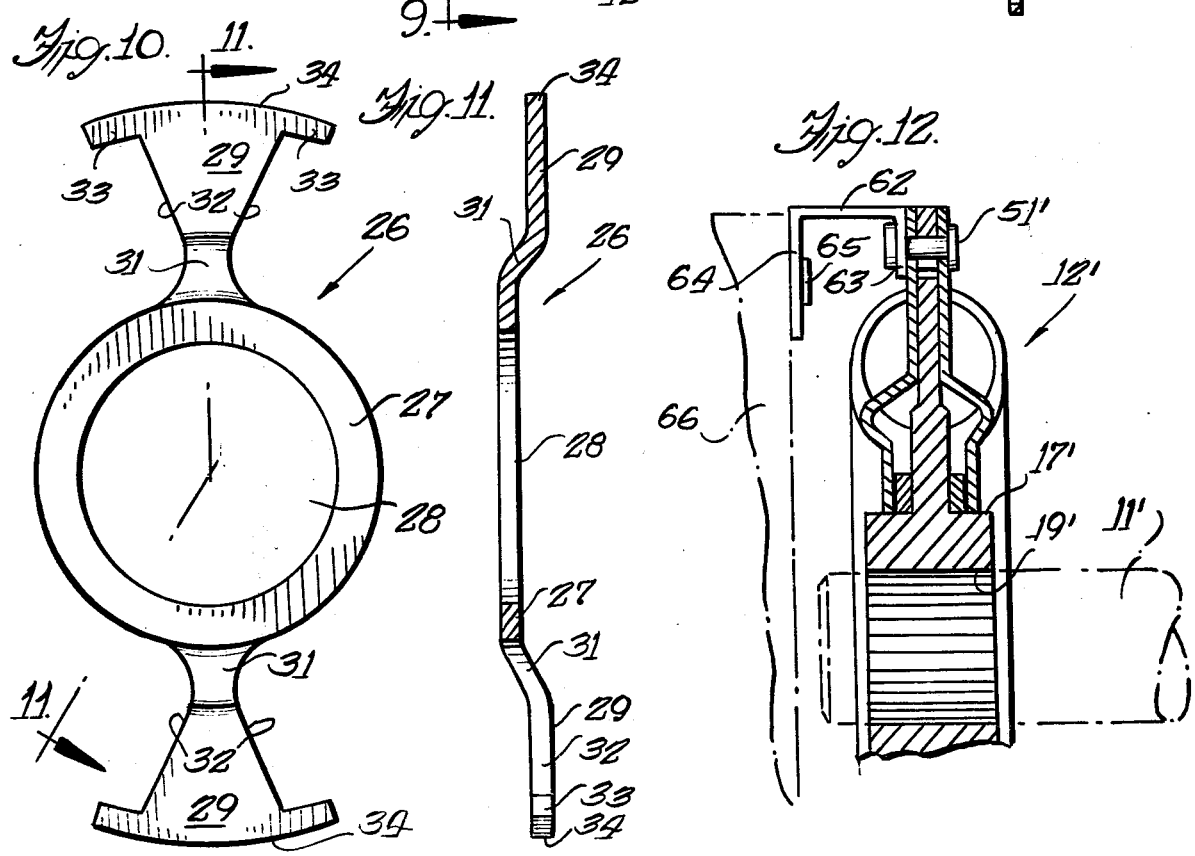

HIGH DEFLECTION AMPLITUDE TORSIONAL VIBRATION DAMPER

BACKGROUND OF THE INVENTION

The drive train for an automotive, marine or stationary power system uses a clutch assembly interposed between a reciprocating piston engine and a manual transmission, and a torsional vibration damper is conventionally utilized in the clutch assembly to neutralize any torsional vibrations emanating from the engine which would otherwise cause undesirable characteristics; e.g. impact loads, pulsations, noises, etc., in the transmission or driveline during operation of the system.

Most presently known vibration dampers provide for a low deflection amplitude and, depending on the torque applied to and through the clutch and the conditions of use, the amplitude of deflection may not be effective to dampen the torsional vibrations under all conditions of use. Also, in a heavy duty torsional coupling, the spring rate required for the compression springs in a conventional damper assembly may be prohibitively high resulting in an uneconomical system. In the pending patent applications Ser. Nos. 801,989, and 801,990, of which I am a co-inventor, two high deflection amplitude vibration dampers are disclosed, however, neither damper assembly is self-contained.

SUMMARY OF THE INVENTION

The present invention relates to an improved vibration damper assembly for a vehicle clutch or the like wherein the damper assembly provides for a high deflection amplitude at a low spring rate. The damper is compact, self-contained, and substantially completely enclosed except for the hub barrel having an opening receiving the end of a driven shaft leading to a manual transmission and for the clutch friction facings which are arranged peripherally beyond the outer edge of the damper housing. The damper provides a means of smoothing out driveline torsional disturbances and objectionable gear rattle noises.

The present invention also comprehends a vibration damper assembly providing a means of supporting groups of springs in series to achieve a high deflection amplitude. The device includes a hub having oppositely extending arms, a pair of equalizers journalled on the hub with each having a pair of oppositely extending arms, and a pair of cover plates enclosing the assembly and carrying the clutch facings beyond the periphery thereof. Compression springs in concentric sets of one, two or three are positioned between the arms of the hub and equalizers within the cover plate so that the springs are arranged in two groups acting in parallel, with each group including three sets of springs acting in series. Drive means integral with the cover plates act to engage the springs adjacent the hub arms.

The present invention further comprehends the provision of a vibration damper assembly providing a means of obtaining a high degree of angular articulation with series of spring so as to achieve a multiple torsional spring rate as desired. The arrangement of the hub and floating equalizers and the sets of compression springs provide a high angular delfection between the clutch plate and housing and the hub on the driven shaft. Varying the values of the spring sets provides a high degree of adjustment of the damping action depending on the characteristics of the clutch structure.

The present invention also comprehends the provision of a vibration damper assembly which is compact and fully enclosed to prevent dislodgement of the compression springs and provides containment of the springs in the event of spring failure or breakage.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a rear elevational view, partially broken away, of the novel clutch driven member and vibration damper assembly of the present invention.

FIG. 2 is a cross sectional view taken on the irregular line 2—2 of FIG. 1.

FIG. 3 is an exploded perspective view of the clutch member and damper assembly.

FIG. 4 is an elevational view of the hub in the damper assembly.

FIG. 5 is a cross sectional view of the hub taken on the irregular line 5—5 of FIG. 4.

FIG. 6 is a partial elevational view of the spacer ring.

FIG. 7 is an enlarged cross sectional view taken on the line 7—7 of FIG. 6.

FIG. 8 is an elevational view of a cover plate.

FIG. 9 is a cross sectional view taken on the irregular line 9—9 of FIG. 8.

FIG. 10 is an elevational view of an equalizer.

FIG. 11 is a cross sectional view taken on the irregular line 11—11 of FIG. 10.

FIG. 12 is a partial cross sectional view of an alternate form of the damper assembly for use in a torsional coupling.

DESCRIPTION OF THE PREFERRED EMBODIMENTS

Referring more particularly to the disclosure in the drawings wherein are shown illustrative embodiments of the present invention, FIGS. 1 and 2 disclose a vehicle clutch member 10 adapted to be mounted on a driven shaft 11 leading to a manual transmission (not shown) and adapted to be positioned between a conventional flywheel and pressure plate (not shown). The clutch member 10 includes a vibration damper asembly 12 and a clutch friction element 13. The friction element comprises a plurality of resilient mounting pads 14 secured to the vibration damper assembly 12 and opposed annular clutch friction facings 15, 15 secured by suitable means, such as rivets 16, to the mounting pads 14. The facings 15, 15 are so positioned as to be axially aligned with friction surfaces on the flywheel and pressure plate.

The vibration damper assembly 12 includes a hub 17 (see FIGS. 4 and 5) having a barrel 18 with an internally splined central opening 19 and a radial flange 21 terminating in a pair of oppositely disposed radially extending arms or tangs 22, 22. The flange 21 is positioned intermediate the ends of the barrel, as seen in FIG. 5, to define a pair of cylindrical shoulders 23, 23a for the piloting of the remaining structure of the damper assembly. Each arm 22 has outwardly diverging edges 24, 24 terminating in circumferentially extending fingers 25, 25.

Rotatably journalled on the shoulders 23, 23a of the hub are a pair of floating equalizers 26, 26a located on opposite sides of the hub flange 21. The equalizer 26 includes an annular body 27 having a central opening 28 receiving the shoulder 23 and a pair of oppositely disposed outwardly extending arms or tangs 29, 29; each arm having an offset portion 31, outwardly diverging edges 32, 32 and circumferentially extending fingers 33, 33 at the outer periphery 34 thereof. The equalizer 26a is identical to equalizer 26 but oppositely oriented with the arms 29a, 29a offset at 31a in the opposite direction to arms 29, 29 when mounted on the hub so that the outer peripheral portions 34 and 34a of the arms 29 and 29a, respectively, will lie in a common plane.

Also, piloted on the shoulders 23, 23a are a pair of cover plates 35, 35a which are identical but oppositely oriented to form a housing. The cover plate 35 includes a generally flat portion 36 having a central opening 37 receiving the shoulder 23, an outwardly and then inwardly rounded annular housing portion 38, and a radially extending peripheral flange 39 containing a plurality of openings 41 and circumferentially spaced slots 42. Stamped inwardly of the rounded portion are a pair of diametrically opposed drive tabs 43 having inward offsets 44; the tab being in substantially the same plane as the peripheral flange 39 (see FIG. 2). The other cover plate 35a is identical in construction with the plate 35 and includes a housing portion 38a, peripheral flange 39a and drive tabs 43a.

To assemble the clutch member, the rear equalizer 26a, one or more friction washers 45a and the cover plate 35a are positioned on the hub shoulder 23a. The front equalizer 26 is then positioned on the shoulder 23 and the groups of springs 53, 54; 55, 56, 57 and 58, 59, 60 are suitably positioned between the hub arms 22 and the equalizer arms 29, 29, 29a and 29a in a manner to be later described. A spacer ring 46 is positioned on the peripheral flange 39a of the plate 35a with openings 47 aligned with the openings 41 in the flange, and one or more friction washers 45 and the cover plate 35 are positioned on the shoulder 23. The friction facings 15 and mounting tabs 14 of the friction element 13 are located with openings 49 in the bases 48 of the pads aligned with openings 41, 41a and 47, and rivets 51 are inserted in the aligned openings and headed to secure the assembly together.

In its assembled condition, the outer peripheral edges of the hub arms and the equalizer arms are radially aligned with the spacer ring 46 and are guided in a channel 52 formed between the peripheral flanges 39, 39a, with the ring 46 forming the base of the channel. Also, the drive tabs 43, 43a in the cover plates 35, 35a are normally axially aligned with the hub arms 22, and are spaced apart, as seen in FIG. 2, to conformably receive the hub arms therebetween. The tabs are in the path of and engage the ends of the spring sets 55, 56, 57 and 58, 59, 60 during use.

The springs are arranged in two groups of three sets of springs acting in parallel, with the spring sets in each group acting in series. The highest rate springs are denoted as a concentric outer spring 53 and inner spring 54 positioned between the equalizer arms 29, 29a of the two equalizers 26, 26a as seen in FIG. 1. Although only one set is shown for the left side of the damper in FIG. 1, an identical set is located in the same position diametrically opposite in the right side of the damper. A concentric set of three springs 55, 56, 57 are positioned between the upper hub arm 22 and the arm 29a of equalizer 26a, while a concentric set of three springs 58, 59, 60 are positioned between the lower hub arm 22 and the arm 29 of equalizer 26. Here again, identical spring sets are positioned diametrically oppositely on the right side of the damper.

In this damper assembly, it is preferred that the spring sets 55, 56, 57 and 58, 59, 60 be of identical strength or rate, although the sets could be of varying rates depending on the desired damper characteristics. The equalizer arms or tangs 29, 29a and the hub arms or tangs 22 control the axial location of the line of thrust of the spring groups by riding on the sides of the channel 52. The size of the fingers 33, 33a on the equalizers as well as the fingers 25 of the hub prevent the spring groups from rubbing on the inside of the plates 35, 35a at 61. Desired friction can be achieved using the friction washers or shims 45, 45a as shown. The spacer ring thickness is controlled to allow free movement of the arms or tangs 22, 29, 29a, or an alternate method of controlling channel 52 is to indent the plates 35, 35a to achieve the same results.

In operation, the friction element 13 receives torque from the driving unit, such as an engine, by engagement with the flywheel and pressure plate (not shown) and energy is transferred to the cover plates 35, 35a containing the integral tabs 43, 43a. The tabs act as abutments for one extremity of the spring groups composed of spring sets. Thus, each tab engages the ends of spring set 55, 56, 57 and compression of this set causes the spring sets to react to one another through the equalizers 26, 26a. As the spring sets 55, 56, 57 and 58, 59, 60 are of equal rates, they will be compressed substantially equally as torque is applied, with the higher rate spring set 53, 54 compressed to a lesser degree. As the torque increases, the spring sets 55, 56, 57 and 58, 59, 60 will be compressed until they reach solid height while the spring set 53, 54 will be further compressed. Obviously, the maximum deflection allowed by the spring sets need not be reached, depending on the resistance to rotation of the hub 17 by the torque output means or driven shaft 11. The torque is transferred from the tabs 43, 43a through the spring sets and equalizers 26, 26a to the hub arms 22, 22 to force rotation of the hub 17 and the driven shaft 11. The cover plates 35, 35a also act as pilots for the hub 17, thus keeping the splines 19 concentric with the friction element 13.

The groups of springs in this assembly act in parallel and their loads are additive, while within each group the spring sets act in series and are not additive. The spring sets in each group may all have the same spring rate and all of the sets will be compressed equally, the spring sets may have varying rates, or the sets may be arranged as above described with two sets having equal rates and the third set having a higher rate depending on the damper characteristics required.

Although the vibration damper in FIGS. 1-11 is shown as adapted for use in a vehicle clutch in conjunction with a manual transmission, this damper assembly can also be utilized in a torsional coupling as seen in FIG. 12. In this embodiment, the vibration damper assembly 12' is identical to that previously shown, and only a flange member 62 is substituted for the friction element 13. The flange member 62 includes an inner mounting flange 63 adapted to be riveted to the cover plates by rivets 51' and an outer flange 64 adapted to be secured by suitably securing means 65 to a flange 66 on the end of a driving shaft. The hub 17' of the damper assembly is operatively connected by splines 19' to a driven shaft 11'. This embodiment operates in the same manner as the damper assembly 12 above described.

I claim:

1. A vibration damper assembly to transmit torque between driving and driven members, comprising an input member adapted to engage torque input means, a hub operatively connected to torque output means and having a pair of diametrically opposed radial arms, a pair of equalizers journalled on opposite sides of the floating independently of said hub, each equalizer having a pair of diametrically opposed radial arms having offset portions so that the outer ends of said arms are in a common plane with said hub arms, resilient means interposed between said hub arms and equalizer arms, and a pair of cover plates substantially completely enclosing said hub, equalizers and resilient means and operatively connected to said input member, each cover plate having integral drive means therein interposed in the path of said resilient means.

2. A vibration damper assembly as set forth in claim 1, in which said cover plates are secured together and journalled on said hub.

3. A vibration damper assembly as set forth in claim 2, in which said cover plates are identical but reversely oriented to each other, each plate including a central portion having an opening receiving said hub, an outwardly and then inwardly rounded portion and a peripheral radial flange, and a spacer ring interposed between said flanges, said flanges and spacer ring being secured together.

4. A vibration damper assembly as set forth in claim 3, in which said drive means comprises a pair of integral tabs stamped inwardly of the rounded portions of the plates to lie adjacent the hub arms.

5. A vibration damper assembly as set forth in claim 4, in which said drive tabs engage at least one end of said resilient means.

6. A vibration damper assembly as set forth in claim 3, in which said flanges and spacer ring form a circumferentially extending channel receiving and guiding the outer peripheries of said hub arms and equalizer arms.

7. A vibration damper assembly as set forth in claim 6, in which said hub arms and equalizer arms each have diverging edges acting to control the axial location of the line of thrust of the resilient means.

8. A vibration damper assembly to transmit torque between driving and driven members, comprising an input member adapted to engage torque input means, a hub operatively connected to torque output means and having a pair of diametrically opposed radial arms, a pair of floating equalizers journalled on said hub, each equalizer having a pair of diametrically opposed radial arms, resilient means interposed between said hub arms and equalizer arms, each hub arm and equalizer arm having diverging edges acting to control the axial location of the line of thrust of the resilient means and terminating in a pair of circumferentially extending fingers, and a pair of cover plates substantially completely enclosing said hub, equalizers and resilient means and operatively connected to said input member, each cover plate having drive means therein interposed in the path of said resilient means, said fingers preventing rubbing of said resilient means on said cover plates, said cover plates being identical but reversely oriented to each other, each plate including a central portion having an opening receiving said hub, an outwardly and then inwardly rounded portion and a peripheral radial flange, and a spacer ring interposed between said flanges, said flanges and spacer ring being secured together so that the cover plates are journalled on said hub, said flanges and spacer ring forming a circumferentially extending channel receiving and guiding the outer peripheries of said hub arms and equalizer arms.

9. A vibration damper assembly as set forth in claim 1, in which said resilient means are spring sets interposed between said hub arms and equalizer arms.

10. A vibration damper assembly as set forth in claim 1, in which said hub includes a barrel with a central splined opening and a radial flange located intermediate the ends of the barrel and defining a shoulder on the barrel on each side thereof, the hub arms extending outwardly from the flange.

11. A vibration damper assembly as set forth in claim 10, in which said equalizers and cover plates are piloted on said hub barrel to retain the concentricity between the input member and the barrel.

12. A vibration damper assembly to transmit torque between driving and driven members, comprising an input member adapted to engage torque input means, a hub operatively connected to torque output means and having a barrel, a radial flange located intermediate the ends of the barrel and defining a shoulder on the barrel on each side thereof, and a pair of diametrically opposed radial arms extending outwardly from the flange, a pair of floating equalizers mounted on the shoulders on opposite sides of said flange, each equalizer including an annular body having a central opening receiving a shoulder and a pair of diametrically opposed radially extending arms having offset portions so that the outer ends of said arms are in a common plane with the hub arms, resilient means interposed between said hub arms and equalizer arms, and a pair of cover plates substantially completely enclosing said hub, equalizers and resilient means and operatively connected to said input member, each cover plate having drive means therein interposed in the path of said resilient means.

13. A vibration damper assembly as set forth in claim 12, in which said cover plates are mounted on said shoulders, and friction washers are positioned between each cover plate and adjacent equalizer.

14. A vibration damper assembly as set forth in claim 12, in which said input member comprises a pair of opposed friction facings on mounting means secured to the flanges of said cover plates.

15. A vibration damper assembly as set forth in claim 12, in which said input means comprises a mounting flange secured to the flanges of said cover plates and adapted to be secured to a driving flange of a driving shaft.

16. A vibration damper assembly to transmit torque between driving and driven members, comprising an input member adapted to engage torque input means, a hub operatively connected to torque output means and including a barrel and a radial flange located intermediate the ends of said barrel and defining a pair of shoulders on the opposite sides thereof, a pair of diametrically opposed integral radial arms extending outwardly from said flange, a pair of floating equalizers journalled on said shoulders on the opposite sides of said flange, each equalizer comprising an annular body having a central opening receiving a hub shoulder and a pair of diametrically opposed radial arms, each arm having an offset portion so that the outer ends of said arms of the equalizers lie in a common plane with the hub arms, said hub arms and equalizer arms each terminating in circumferentially extending fingers, a spring set comprising concentric springs located between each hub arm and equalizer arm, each hub arm and equalizer arm having outwardly diverging edges which act to control the line of thrust of the spring sets, a pair of cover plates substantially enclosing said hub, equalizers and spring sets and operatively connected to said input member, each cover plate including a central portion having an opening receiving a shoulder, an outwardly and then inwardly rounded housing portion and a peripheral flange, the cover plate being reversely oriented to each other to form a housing, a spacer ring located between the flanges of the cover plates, said flanges and spacer ring being secured together and forming a guide channel receiving the outer edges of the hub arms and equalizer arms, one or more friction washers positioned on each shoulder between the cover plate and adjacent equalizer, and a pair of drive tabs integral with each cover plate and stamped inwardly of the rounded portions thereof to lie adjacent the hub arms and in the path of said spring sets.

17. A vibration damper assembly as set forth in claim 12, in which said drive means comprises a pair of integral tabs stamped inwardly of the cover plate profile to lie adjacent the hub arms.

18. A vibration damper assembly as set forth in claim 17, in which said tabs are generally axially aligned with said hub arms in the absence of applied torque.

19. A vibration damper assembly as set forth in claim 12, in which said cover plates are identical but reversely oriented to each other, each plate including a central opening receiving said hub and a rounded contour terminating in a peripheral flange, said cover plates being secured together at said flanges and journalled on said hub.

* * * * *

UNITED STATES PATENT OFFICE
CERTIFICATE OF CORRECTION

PATENT NO. : 4,139,995
DATED : February 20, 1979
INVENTOR(S) : Paul Emile LaMarche It is certified that error appears in the above-identified patent and that said Letters Patent are hereby corrected as shown below:

Column 5, line 6, cancel "the" and insert -- and --.

Column 5, line 10, cancel "plane" and insert -- plate --.

Column 7, line 7, cancel "plate" and insert -- plates --.

Signed and Sealed this

Twelfth Day of June 1979

[SEAL]

Attest:

RUTH C. MASON
Attesting Officer

DONALD W. BANNER
Commissioner of Patents and Trademarks